United States Patent [19]

Balut et al.

[11] 3,953,137

[45] Apr. 27, 1976

[54] NUCLEAR-BURST STRENGTH DETECTING AND MEASURING DEVICE

[75] Inventors: Jacques Albert Louis Georges Balut, Arcueil; Pierre Eugene Gerard K. Lemaire, Paris; Claude Michel Loisy, Antony, all of France

[73] Assignee: Etat Francais, Paris, France

[22] Filed: Apr. 5, 1971

[21] Appl. No.: 131,516

[52] U.S. Cl. ............................. 356/222; 250/338; 340/227 R; 356/227
[51] Int. Cl.² ................................................ G01J 1/42
[58] Field of Search .......... 356/218, 219, 222, 227; 250/338; 340/227 R, 228, 231; 328/2

[56] References Cited
UNITED STATES PATENTS

| | | |
|---|---|---|
| 3,147,380 | 9/1964 | Buckingham et al. .......... 250/83.3 H |
| 3,254,219 | 5/1966 | Finlay et al. ........................ 250/338 |
| 3,281,811 | 10/1966 | Cotterman et al. .............. 340/227 R |

FOREIGN PATENTS OR APPLICATIONS 1,525,430  4/1968  France ................................ 356/218

Primary Examiner—Richard A. Farley
Assistant Examiner—S. C. Buczinski
Attorney, Agent, or Firm—Haseltine, Lake & Waters

[57] ABSTRACT

A continuous-operation automatic device for detection and accurate measurement of the strength of a burst generating an emission from luminous or infrared sources. This device characterizes and analyzes the maxima and minima of a "thermal flux/time" curve. The device comprises a master time element and an assembly of photoelectric detectors, an electronic processing system coupled to the detectors, and a mechanical system securing the rigidity and positioning of the photoelectric detector assembly with respect to an octahedral prism based on a horizontal plane.

12 Claims, 6 Drawing Figures

NUCLEAR-BURST STRENGTH DETECTING AND MEASURING DEVICE

FIELD OF INVENTION:

The present invention relates to automatic devices for the detection of luminous or infrared sources and for the measurement of the time intervals separating the following: the moment of appearance of the second emission peak $t_{2max}$ from the first moment of the emission $t_0$; the moment of appearance of the second emission peak $t_{2max}$ from the moment of appearance of the first emission peak $t_{1max}$; and the moment of appearance of the second emission peak $t_{2max}$ from the moment of appearance of the first minimum of emission $t_{min}$ of luminous or infrared sources — the first emission peak ($t_{1max}$) of light arising from the source to be detected being available as the initial moment of the emission of light. Such automatically operating electronic devices allow the time differences listed above to be detected and measured in a demodulation field which can extend through a 360° bearing and can exceed 180° elevation.

PRIOR ART

Devices are already known for detecting and automatically measuring in sequence certain characteristics of emission from a source of light. For example, there are systems with weak elevational field of remote demodulation range which are highly sensitive but give critical and uncertain automatic readings. They involve pronounced chances of bug (accidental) triggerage such as through atmospheric lightning flashes. Validity of detection being doubful entails the risk of triggering a sequence of readings on a bug which gives rise to saturation risks (particularly when the sun is the bug) and involves the possibility of nonmonitoring during the period of the saturation sequence.

There are also other systems of higher elevational field and weaker range of demodulation and sensitivity than in the foregoing case but of less accuracy in readings. In these latter systems, the chance of bug triggerage (for example, on atmospheric flashes) is still not negligible. Detection validity of such apparatus is dubious and offers the risk of triggering the reading sequence on a bug and involving the possibility of nonmonitoring during the sequence.

SUMMARY OF THE INVENTION

It is an object of the invention to provide improved devices for the detection of nuclear bursts and the like.

A further object of this invention is to mitigate the inconsistency existent when there is desired as large a demodulation field as possible and maximum sensitivity governing the range of detection, accuracy of readings and the chance of bug or hash triggering which governs the demodulation value and nonmonitoring rate.

The present invention is characterized in that it associates satisfactory demodulation sensitivity and satisfactory reading accuracy with zero chance of bug triggerage especially from storm lightning. The demodulation field extends over a 360° bearing and a 180° elevation taking into account the detection of the direct light or the diffused light emanating from the source to be detected.

Apparatus of the invention is used for detecting and determining the force of a nuclear burst. This latter is characterized by the unexpected appearance at any arbitrary angular position whatever of a fireball of extremely high luminance and the emission of a luminothermal signal of decidedly characteristic shape (see FIG. 1) giving in its period a first emission peak $t_{1max}$ followed by an emission trough $t_{min}$ then a second emission peak $t_{2max}$ before the extinction of the light effect.

The moments of appearance of the luminothermal trough and of the second luminothermal peak are characteristic of the force of the burst $w$. Reading of the time intervals separating the blastoff from the appearance of the luminothermal trough and the second luminothermal peak allow the burst force to be determined by means of the known relations $w = f(t_{min})$ and $w = f(t_{2max})$. The first luminothermal peak being produced in a sufficiently short time after the blastoff can be taken as the initial moment of the burst.

The invention will be better understood by means of the following description and together with the attached drawings which are given solely by way of non-limitative illustration.

DETAILED DESCRIPTION

Figure 1:
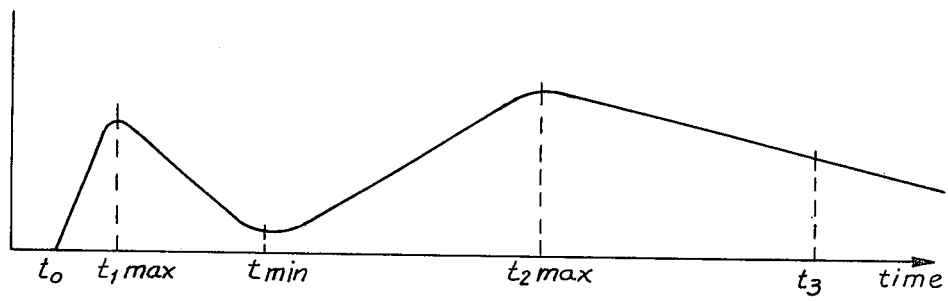
FIG. 1 is a representative luminothermal curve of a nuclear burst.
Figure 2:
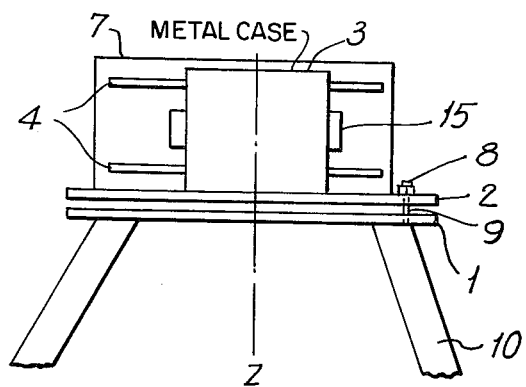
FIGS. 2, 3, 4, 5 and 6 show the photoelectric elements of an embodiment of the invention.

In FIG. 2 is shown a base 1 resting on the ground by means of a tripod 10; and a table 2 resting on base 1 through three leveling screws 9 and comprising spirit levels to insure horizontality at the marking position.

Figure 3:
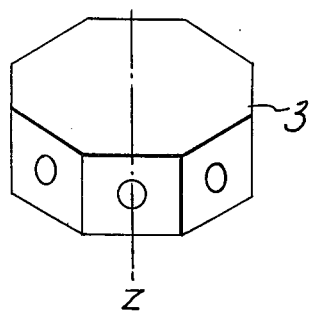
Figure 4:
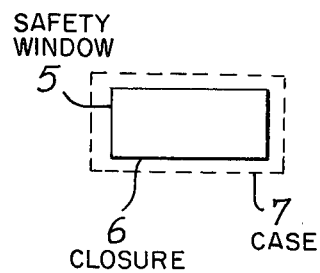

A sealed metal case 3 shown also in FIG. 3 has the form of an octahedral prism based on the Z-axis and has suitable dimensions of, for example, 8 inches diameter and 6 inches height. The case 3 makes a single unit with table 2.

A sun shield 4 formed of two cylindrical disks in one piece with the case 3 excludes the direct effect of the sun on the detectors when same is outside the field delimited by the two cylindrical disks and the actual field of the detector assembly.

A cylindrical glass safety window 5 is provided which does not alter the reception and detection characteristics of the device, especially with regard to its field and the spectral sensitivity of the photoelectric detectors 15. Said window is closed top and bottom by a mechanical device 6. The assembly 7 comprising the mechanical device and the cylindrical glass window 5 insures safety and impermeability of elements 3, 4 and 15. The assembly 7 is of one piece with table 2. Setting the table 2 in a horizontal plane results in positioning the axis of cases 3 and 7 according to the local plumb.

Figure 5:
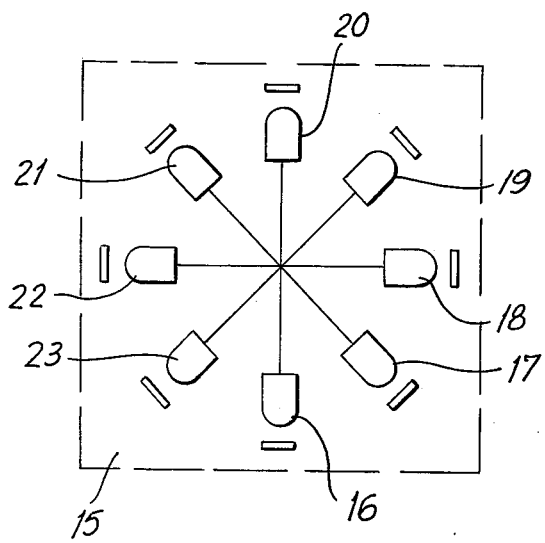

With reference to FIGS. 2 and 5, case 3 carries an assembly 15 of photoelectric detectors comprising a set of eight photoelectric detectors 16 and 23 working in parallel. Each detector is rigidly connected with the case and is located on a corresponding face of the octahedral-base prism. Each of the detectors is of a type appropriate to the nature of the radiation expected and is preferably a silicon photodiode. The use of vacuum photocells and photomultipliers is also possible.

The choice of detectors is decided by the following factors: response speed, spectral sensitivity, dynamic sensitivity, noise and direct flux dark current, magnitude of sensitive area, evolution of the characteristics during the period.

The set of detectors 16 to 23 is located to receive the direct or diffused flux emanating from the source under detection. The network of detectors 16 to 23 offers a 360° polar diagram in the horizontal plane and is limited to an included angle of 20° in the vertical plane.

Figure 6:
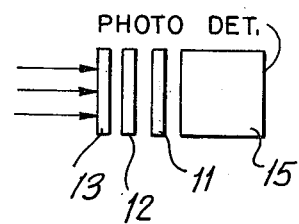

Filters 11 (FIG. 6) are fitted in front of the sensitive surface of each detector, these being neuter filters or selective filters or even a combination of both for the purpose of protecting the detector while at the same time sustaining maximum contrast between the signal and the background. For example, selective filters may be used which focus the optical band-pass on the 6000 to 9000 A or on the 4000 to 6000 A or the 7000 to 9000 A bands. Field diaphragms 12 can also be fitted in front of the cells. Safety windows 13 which do not alter the nature of the detected radiation and the optical characteristics are fitted in front of the detectors to insure the impermeability and safety of the sensitive area of the detectors and possibly of the filters and diaphragms.

Figure 7:
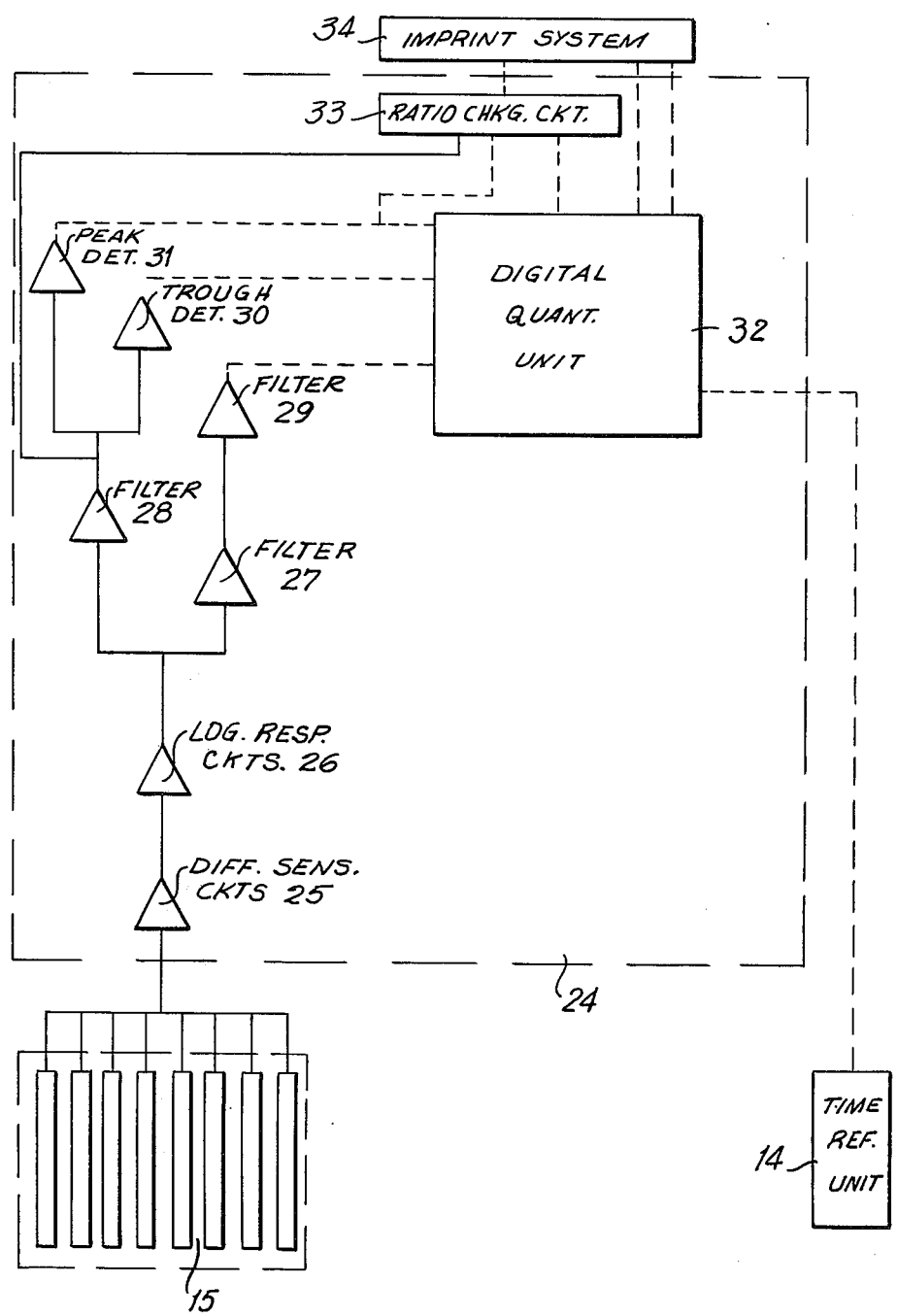
FIG. 7 is a block diagram of an electronic system coupled to the apparatus of FIGS. 2–6.

Referring to FIG. 7, the electronic unit 24 attached to the invention comprises:

a time reference unit 14;

constant differential-sensitivity circuit 25 whose effect is to suppress the continuous component and amplify the intelligence signals;

logarithmic response circuits 26 whose purpose is to cut down the volume range of the signal and cut out any signal of amplitude lower than a set threshold;

frequency-trapping circuits comprising a band-pass filter 27 isolating the fast components and a low-pass filter 28 isolating the slow components;

periodic filtering circuits 29 which, when the incident signal (fast component) has a build-up time less than a preset build-up time $t$, supply a short pulse at the moment $t_{1max}$ of the signal;

trough or threshold-overshoot detector circuits 30 which supply a short pulse at the moment $t_{min}$, for each passage of the incident signal (slow component) passing through a minimum or overshooting a preset threshold;

peak detector circuits 31 which supply a short pulse at the moment $t_{2max}$ for each passage of the incident signal (slow component) passing through a maximum; and a digital quantization unit 32 for processing of the data resulting from the pulses leaving the circuits 29, 30 and 31 and the time reference 14.

The quantization unit 32 comprises among other things two logarithmic-decrement shifting registers, at the input whereof the data received at the moments corresponding to $t_{1max}$ and $t_{min}$ are entered respectively. A third reading out register allows rapid reading of the first two at the moment corresponding to $t_{2max}$. This facilitates constantly accurate reading of the time intervals $(t_{2max} - t_{1max})$ or $(t_{2max} - t_0)$ and $(t_{2max} - t_{min})$ as well as their ratio.

An electronic circuit 33 which, from the dot pulse generated from cognition of the moment $t_3$ (instant of symmetry to the moment $t_{min}$ with respect to $t_{2max}$) supplied by the digital quantization unit 32, has the purpose of checking whether the ratio of the amplitude of the slow signal at moment $t_3$ to the amplitude of the slow signal at the moment $t_{2max}$ is higher than a predetermined value and of supplying the corresponding data (value fixed at 40%).

An imprint system 34 allows restoration of data corresponding to the value of $(t_{2max} - t_{1max})$ and data corresponding to the correlation accuracy between the readings $(t_{2max} - t_{1max})$ obtained on checking that the ratio $(t_{2max} - t_{min})$ to $(t_{2max} - t_{1max})$ is comprised between the value "unity" and any one of the predetermined values. Such correlation consists of putting the ratio $(t_{2max} - t_{1min})$ to $(t_{2max} - t_{1max})$ in one of the windows comprised respectively between the values "unity" and several graded values.

The principle of detection and the readings is explained as follows:

Set up at any point whatsoever on land, sea or in space, the device allows continuous permanent scanning of an operational sector, coupled with other detector or localization devices or not. Briefly, the principle of the apparatus consists of detecting and analyzing in time and form any luminothermal signal emitted in the field of survey of a static set of photoelectric detectors arranged on the respective faces of an octahedral-based prism standing on a horizontal plane, particularly in a land application.

Such an arrangement allows the scanning of a 360° field in the horizontal plane and at least 180° in a vertical plane. In the absence of a light source in the scanning field the electric signal proceeding from the photoelectric detector grouping varies in accordance with the variations of the surrounding medium.

When a light source is present in the scanning field, the intensity of the signal picked up can vary within a very wide range according to the distance from the source under detection, its height or altitude, intensity, strength and attentent atmospheric conditions.

Therefore, there is used for a field of detection: a suitable set of detectors whose dynamic sensitivity can cover the whole of the dynamic of the intensity of the signal to be picked up and analyzed, and a logarithmic-response and constant differential sensitivity circuit to mitigate fluctuations in the ambient level.

When in any direction whatsoever an emission of light occurs involving a change in illumination at the level of the photoelectric detectors, the latter supply an electric signal with the same charcteristics as the luminothermal signal produced by the source of light.

In the preferred but non-limitative use of detection and reading of the strength of a nuclear burst, the emitted signal is distinguished among other things by the appearance of a primary flash of thermal radiation, the fast component, whose peak corresponds to the moment $t_{1max}$, then the luminous intensity decreases to a minimum at the moment $t_{min}$, increasing thereafter until it reaches a second peak; the slow component, at the moment $t_{2max}$.

In practice, the moments $t_{min}$ and $t_{2max}$ depend only on the strength of the burst and are interlinked by a known relationship $t_{2max} = kt_{min}$.

The electric signal arising from the photoelectric detectors is analyzed in time and shape by a suitable electronic processer which supplies the characteristic data of the detected signal thus allowing the strength of the nuclear burst to be determined from the readings of the time intervals $(t_{2max} - t_1)$ and $(t_{2max} - t_{min})$.

The reconnaissance criteria used in the device for a nuclear burst are the following:

detection and storage of the "date" of the amplitude peak of a fast pulse, whereof the amplitude is higher than a threshold and whose build-up time is less than or equal to the build-up time corresponding to the most violent ground burst of the detection range reserved; as an indicative example, for a 10 MT burst the build-up time is less than or equal to 5 ms;

detection and reading of the build-up front time ($t_{2max} - t_{mix}$) of a slow pulse consecutive to the fast pulse whose amplitude is higher than a threshold. The build-up time has to be greater than or equal to the build-up time corresponding to the weakest aerial type burst and less than or equal to the build-up time corresponding to the strongest contact-type burst. For the reserved detection range, 1 KT to 10 MT, the build-up time will line between 39 ms and 2.6 s;

correlation between slow pulse and fast pulse starting from the reading of ($t_{2max} - t_{min}$) which given as evaluation of the burst strength.

Such evaluation allows detection in a timing window, prior to the moment $t_{min}$, that can vary with the strength evaluated, of the possible fast pulse whose amplitude peak corresponds to $t_{1max}$ which has to correspond to the evaluated strength.

The qualification of $t_{1max}$ regarded as the moment of origin of the burst enables ($t_{2max} - t_{1max}$) to be obtained, making a fresh determintion of the strength possible; and checking that the slow pulse keps a residual amplitude greater than a fraction of the maximum amplitude after a decay time equal to the build-up time.

It is thus ascertained that the slow pulse keeps a residual amplitude higher than 40% of the maximum amplitude after a decay time equalling the build-up time.

The chronological order and means of analysis of the forms and readings of the times that lead to the "blast detection" criterion and the strength reading are determined by taking into account:

a zero rate, false alarm and nonmonitoring; and the existence, nature and quantity of bugs of very similar characteristics of rapid peak or slow peak, considered separately or not.

Preliminary processing of the signal is as follows:

the input part of the apparatus is a photoelectric sensor 15 able to convert the illumination it receives into an electric signal of the same formal characteristics. Such illumination is due to the light emitted by the burst, at different parasitic emissions and particularly with the continuous background atmosphere occasioned by solar light, the signal due to nuclear explosion does not comprise a continuous component, as a first filtering consists in suppressing such component as it leaves the photoelectric detector (through circuits 25).

Because of the considerable power of the expected signals, the next step is logarithmic differentiation (through circuits 26) which last involves a blunting of the peaks of the strong signals, but does not affect the periodic characteristics serving for the measurement, these being the time intervals between the characteristic points of the signal.

The need to identify separately the two parts of the signal, dot pulse and slow pulse is the reason for placing bandpass filter 27 at the output of the logarithmic amplifier to isolate the fast components and low-pass filter 28 to isolate the slow components.

The criteria reserved for identifying the dot pulse of the signal produced by an atmospheric nuclear burst are as follows:

the pulse amplitude will have to be greater than a threshold determined in terms of noise level and controlled thereby; and the pulse build-up time will have to be less than or equal to the pulse build-up time corresponding to the most powerful burst to be detected (by circuits 29).

The moment of appearance of the pulse peak is detected and, at that moment, if all the preceding criteria are fully satisfied, an impressed pulse is generated intended for the input of a phase difference register; this last then behaves like a discrete-delay line for the data element considered.

Each bus being characterized by the delay $\tau$ that separates it from the register input, the presence of a "1" on bus $\tau$ at a given instant means that at a moment preceding that of the interval $\tau$, a fast-pulse peak was produced responding to the criteria.

At every instant when sampling the register content, there is thus available the whole of the periods that have elapsed between each of the different moments of the reserved dot-pulse peaks and the "moment of reading."

Considered as forming part of the signal produced by atmospheric nuclear bursts are those slow pulses that:

overshoot a threshold that has been adjusted in terms of the noise level;

possess a build-up time lying between those corresponding to the signals emitted by nuclear bursts of extreme strengths for the contemplated range of detection; and after a decay time equal to the build-up time, retain a residual amplitude greater than a fraction of the maximum amplitude.

For the fraction comprising only the slow components, the spanning of the amplitude threshold corresponds to the signal minimum. However, because of the possible presence of bugs, allowance must also be made to take care of every trough that appears on the slow bus. The question is then one of reading the time separating a threshold crossing or a trough from the first peak following it. However, it is desirable not to begin such reading on a threshold crossing or minimum if one is sure it cannot concern a signal proceeding from a nuclear burst. This is particularly the case if at that instant no suitable fast signal has been recorded for some definite time in terms of the signal corresponding to the most powerful bursts to be detected. The time measurement will therefore be effected in this case also by a shifting register on whose input a bit will be impressed at the moments of the appearance of a minimum or threshold crossing, with the proviso that these are encountered in a window of definite duration, opened each time an impression is made in the fast signal register. Reading of the register at the moment of the first following peak will give the time interval value ($t_{2max} - t_{min}$) through the position of the bit in the register.

Because of the separate identification of the two, fast and slow portions of the signal, it is necessary to make sure that the time lag between the slow-pulse peak and that of the fast pulse is correct, taking into account the slow-pulse build-up time. Such check-up can only be made from the moment of the slow-pulse peak. That is why all possible dot-pulse moments have been stored. It is in fact enough at the slow-pulse peak moment to see if, bearing in mind the value of such pulse's build-up time, a qualified dot-pulse was produced at some moment as might relate to a nuclear burst. In practice, the build-up time value allows a delay bracket to be defined, consequently a certain number of register buses in which coexistence can be looked for. The number of the bus possibly tallying with such coincidence will facilitate, in addition to a strong presumption that a nuclear burst has taken place, an evaluation of its strength.

The shifting register is therefore used here as an incremental lag line capable of delaying a signal comprising only one bit. Quantification of the delay by the shifting register returns in fact to the definition of the power channels for the measurement. Obviously to avoid too great a complexity in the apparatus, the power channels must be defined in the best way so as to limit their number as much as possible. The optimum consists in defining channels whose width may be such that the relative error on the potential reading due to quantification may be constant throughout the measuring range and negligible compared with that due to the method of evaluating the potential from the periodic characteristics of the signal. In the embodiment described, the number of potential channels is close to 100 and the relative error on the potential measurement is ± 6%. The channels will therefore be such that the width of each one in duration represents a constant fraction of the delay corresponding to that channel, meaning that the law relating the number of channels to the delays is logarithmic. With such a system, it is possible to bring out the ratio between two durations measured by the appearances of two bits in the same register or in two different registers of the same construction, such ratio is directly a function of the difference in number of channels among the buses where the two bits appear. This fact is used to bring out the relation between the two durations measured on one signal and for operating the last validation criterion.

The channels being therefore of different widths, the corresponding delays will not all be identical; also the register will not have the same shift tempo over its whole length, in fact the speed becomes attenuated proportionately as the overall delay increases. However, in practice, such speed varies discontinuously.

The register must therefore be regarded as a sequence of subregisters arranged in series. Each subregister undergoes shifts to the tempo of a clock slower than the one before it. It will be assumed that the clocks are obtained by dividing the reference clock 14 by the numbers 5, 6, 7, 8 and their multiples.

The bits appearing at the output of the preceding subregister are recorded at the input of each subregister, the corresponding state to the appearance of a dot pulse being regarded as preemptive. Consequently, the cyclic data loss due to the lowering of speed of the register will in no case entail the last of the information that crystallizes the presence of a dot pulse.

The problem is to recognize if at the peak moment, the two time readings ($t_{2max} - t_{min}$) and ($t_{2max} - t_1$) or ($t_{2max} - t_o$) are in a ratio approaching 8/9 at a preset precision. In practice, it is possible to check that such ratio is comprised between unity and a value to be fixed at less than 1.

For that purpose, it will be enough to ascertain that at the peak moment the bit corresponding to the fast pulse does not have in its register, in relation to the one corresponding to the minimum in its own, an advance greater than a fixed number of bins. To give such criterion a variable breadth, it will be effected simultaneously for several widths of window.

It remains therefore to verify the last criterion of slow pulse. This operation can be effected as follows:

It can be checked that at the instant of symmetry of the moment of the minimum in respect to that of the peak, the residual amplitude remains greater than a given fraction of the maximum amplitude.

One bit has been recorded at the register input at the moment of the mimimum; at the peak moment, the presence of the bit in channel $\tau$ defines the period separating the two moments; the appearance of the same bit in channel $\tau + N$ (N being the number of channels required on doubling the period) will occur at the instant of symmetry of the minimum with respect to that of the peak.

This operation being the last of the measurement in progress, the contents of this register can then be erased so as to allow the possible start from that moment of another reading without the danger of correlating some results corresponding to distinctly different signals.

At the moment of reading $t_{2max}$, the numbers of the boxes where the data corresponding to $t_{min}$ and $t_{1max}$ are known, it is then possible on the basis of such data to determine the data corresponding to the value of the time interval $t_{min} - t_{1max}$.

The automatic determination of the number of bins separating the data corresponding to $t_{min}$ and $t_{1max}$ being obtainable by addition of an electronic computer to the digital processing assembly 32.

In the apparatus described hereinabove, the eight silicon photoelectric cells arranged on the eight sides of an octagonal support shown at 15. They are electrically connected in parallel so that the output signal is the sum of the currents from the eight cells.

The role of the circuit 25 is to ensure maintenance of the logarithmic amplifier 26 at the maximum of sensitivity in the absence of intelligence signals; actually in the absence of said circuit 25, the point of action of logarithmic amplification would be shifted under the effect of the direct current fed by the cells subject to ambient light.

Circuit 25 develops an equalizing current governed by the stand-by direct current coming from the cells. Said equalizing current is subtracted from the stand-by current, so that the off point of the circuit 26 stays practically stable in the absence of a signal. The control time contant when there is no signal is approximately 10 constant mS, which allows satisfactory rejection of the slow pulses and allows the passage of the fast signal pulses such as those from a first nuclear burst flash.

When such a fast pulse is detected, a logical system raises the time constant from 10 mS to 100 seconds so as to accept without distortion the slow pulse of the light signal coming from the second nuclear burst flash.

Circuits 27 and 28 are band-pass and high-pass linear filters respectively the object whereof is to orientate the fast and slow signals corresponding respectively to the first and second nuclear burst flash toward the appropriate processing buses. Their characteristics are determined from consideration of the signal frequency spectra of the first and second flash of a nuclear burst throughout the whole power span under contemplation.

Circuit 29 is a loaded circuit for analysing any sudden variation in luminance, especially any that appears at the beginning of a nuclear burst (B.B. or E.N.). It supplies a pulse at the peak moment $T_{1\ max}$ if the signal build-up time lies between $100\mu^S$ and $5\mu^S$. Such pulse is introduced at the input of a shifting register (at 32).

Circuit 30 is a trough demodulator supplying a pulse on the passing of the signal through a minimum or on the signal level overshooting a preset threshold.

It supplies a pulse at the intant of the signal minimum when such signal minimum is of higher amplitude than a preset threshold. When the full signal minimum stands below such threshold, it supplies a pulse at the moment when the signal having exceeded such minimum crosses the threshold while rising toward the second flash peak ($T_{2\ max}$). This pulse is imprinted at the input of a second shifting register (at 32).

Circuit 31 is a peak demodulator supplying a pulse at the instant of the slow signal passing through a peak (at time $T_{2\ max}$).

Circuit 32 comprises the logarithmic progression shifting registers wherein a data bit corresponding to $T_{1\ max}$ arising from circuit 29 and a data bit corresponding to $T_{min}$ and arising from circuit 30 are respectively imprinted.

At the moment $T_{2\ max}$, the data arising from circuit 31 calls forth the reading of the shifting registers in order to determine if there is a $T_{1\ max}$ bit and a $T_{min}$ bit in those registers at a certain "gap" expressed by a number of cells of the shifting registers. This operation is the correlation of the pulses $T_{1\ max}$, $T_{min}$ and $T_{2\ max}$. In this way it is established if the ratio $$\frac{T_{2\ max} - T_{min}}{T_{2\ max} - T_{1\ max}}$$

is less than or equal to a given value.

Circuit 32 also comprises two impulse counters displaying the number of shifting register cells respectively traversed by the $T_{1\ max}$ bit and the $T_{min}$ bit.

At the moment $T_{2\ max.\ max}$, scanning is effected. If correlation is established, the coincidence data appears right away and the state of the two counters is forthwith stored so as to facilitate output of data on the imprint system 34.

Circuit 33 is the assembly of circuits enabling the level of signal at instant $2 \times (T_{2\ max} - T_{min})$ to be compared with the signal level at the instant $T_{2\ max}$.

There is an additional presumption of a nuclear burst if the ratio $$\frac{\text{Level at } 2 \times (T_{2\ max} - T_{min})}{\text{level at } T_{2\ max}}$$

is greater than a present value. If this criterion is established, the circuit 33 supplies a validating datum to be issued by the imprint system 34.

Sampling control of signal amplitude at $2 \times (T_{2\ max} - T_{min})$ is secured in circuit 33 by a counter whose function is to add a defined number N of cells to the number of cells of a logarithmic progression shifting register. In point of fact, the serial law being logarithmic, by adding a fixed number N of cells to the number of cells corresponding to the time interval ($T_{2\ max} - T_{min}$), a determined value is obtained at the register output for the ratio:

Pulse output period imprinted in register/Time interval ($T_{2\ max}\ T_{min}$).

What is claimed is:

1. A device for detecting and analyzing in time and form a lumino-thermal radiation signal received from a nuclear-type explosion or burst, said device comprising:
   a. an array of photoelectric cells;
   b. a polyhedral prism based on a horizontal plane and including a plurality of faces; said photoelectric cells being arranged at the faces of said polyhedral prism and providing electrical outputs dependent upon the received lumino-thermal flux values;
   c. electronic means connected to employ said electrical outputs to produce first and second signal pulses respectively upon the successive occurrence of a first ($t_{1max}$) peak value and a second ($t_{2max}$) peak value of the received flux, and to produce an intermediate signal pulse at an instant ($t_{min}$) between the respective instants of occurrence of the said first and second peak values when the received flux value rises through a predetermined threshold value or passes through a minimum while remaining above said threshold value;
   d. timing means connected with said electronic means; and
   e. digital processing means connected to receive said signal pulses and to operate in dependence thereupon and in cooperation with said timing means for establishing the relative instants of occurrence of the respective signal pulses to provide an indication of the receipt of radiation that has flux values which vary with time in accordance with a preselected kind of waveform, which is a waveform produced by a nuclear explosion.

2. A device according to claim 1 wherein the photoelectric cells are silicon photodiodes and said polyhedral prism is a octagonal prism the whole of which provides a 360° polar coordinate range in the horizontal plane and an included angle of 20° in the vertical, said device further comprising for the protection of each cell a sun shield and selected filters peaked on the optical reception band of 6000 A. to 9000 A. or 4000 A. to 6000 A. or 7000 A. to 9000 A.

3. A device according to claim 1 wherein said electronic means produce said first signal pulse only if corresponding first peak value of the received flux is above a preselected threshold value.

4. A device according to claim 1 wherein said electronic means includes a means for providing a measure of the power of a detected nuclear explosion calculated from the timing of said intermediate signal pulse, and/or of said second signal pulse.

5. A device according to claim 1 wherein said electronic means includes amplifier means of constant differential sensitivity for suppressing a continuous background component of said electrical outputs relative to significant signals constituted by changes superimposed on said continuous background component.

6. A device according to claim 5 wherein said electronic means includes logarithmically responsive means connected to compress the range of amplitude of said significant signals passed from said amplifier means.

7. A device according to claim 6 wherein said electronic means includes first and second frequency-selective filters connected to pass lower frequency signals, and higher frequency signals respectively to separate channels in a further electronic circuitry.

8. A device according to claim 7 wherein each of said frequency selective filters is connected to receive as its input the compressed signals from said logarithmically responsive means.

9. A device according to claim 8 wherein said electronic means includes time filtering means connected to pick out from the separately channelled higher frequency signals only any rising-value signal whose magnitude increases through a preselected threshold value and whose time of rise from that threshold value to a peak is less than a preselected limiting value, said time filtering means being arranged to generate said first signal pulse when such a rising value signal reaches its peak.

10. A device according to claim 9 wherein said time filtering means are connected to supply each such first signal pulse to an input of a shifting register of said digital processing means.

11. A device according to claim 9 wherein said preselected limiting value for the time of rise is substantially five milliseconds.

12. A device according to claim 10 wherein said electronic means includes minima-detection means connected to receive separately channelled lower-frequency signals and to deliver said intermediate signal pulse when, but only when the magnitude of such a received lower-frequency signal either rises through a set threshold value or passes through a minimum while remaining above said set threshold value.

* * * * *